United States Patent [19]
Carrison et al.

[11] 4,016,736
[45] Apr. 12, 1977

[54] LUBRICANT PACKED WIRE DRAWING DIES

[75] Inventors: Lynn Cloyd Carrison, Columbus; Robert George Wetzel, Chesterland, both of Ohio

[73] Assignee: General Electric Company, Columbus, Ohio

[22] Filed: June 25, 1975

[21] Appl. No.: 590,155

[52] U.S. Cl. ................................... 72/41; 72/467
[51] Int. Cl.² ....................... B21C 3/02; B21C 9/00
[58] Field of Search ............... 72/41, 43, 44, 274, 72/467; 76/107 A

[56] References Cited
UNITED STATES PATENTS

| | | |
|---|---|---|
| 3,641,795 | 2/1972 | Lester et al. ................. 72/43 X |
| 3,705,509 | 12/1972 | Haller .............................. 72/45 |
| 3,831,428 | 8/1974 | Wentorf et al. .................. 72/467 |

*Primary Examiner*—C.W. Lanham
*Assistant Examiner*—E. M. Combs
*Attorney, Agent, or Firm*—Donald J. Voss; Granville M. Pine; Edward A. Hedman

[57] ABSTRACT

Wire drawing dies having improved life, relatively lower drawing force requirements and producing smooth surface on wires drawn therethrough comprise compacts of polycrystalline diamond, polycrystalline cubic boron nitride and mixtures thereof, which include a centrally-located double tapered hole having micro-rough walls, the micro-rough walls being densely packed with a lubricant for wire drawing.

18 Claims, 8 Drawing Figures

U.S. Patent  April 12, 1977  4,016,736
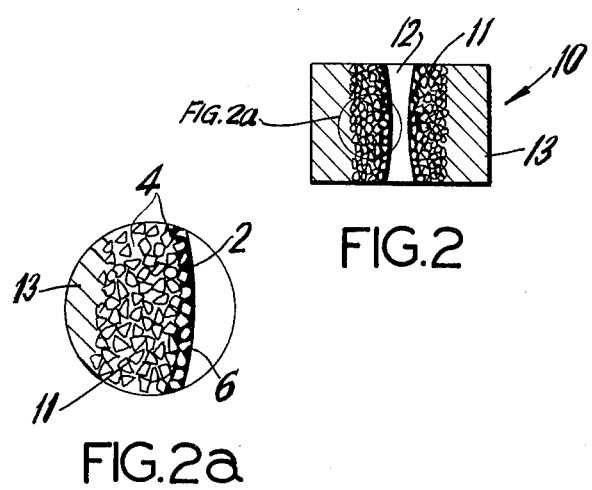
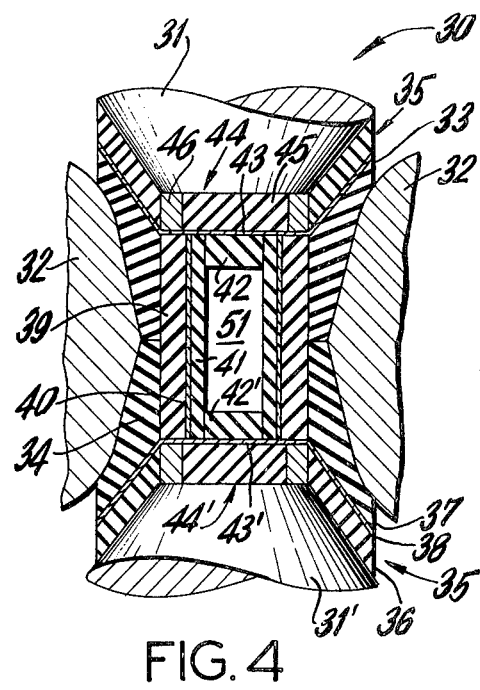
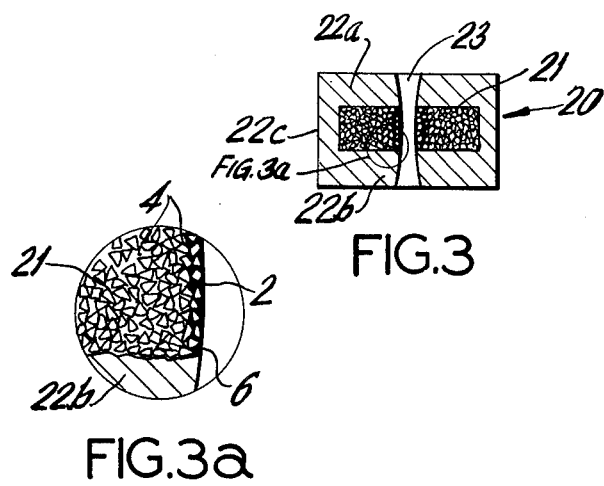
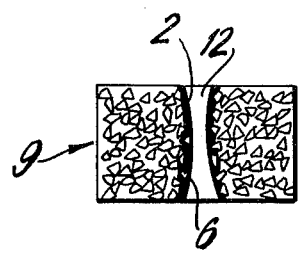
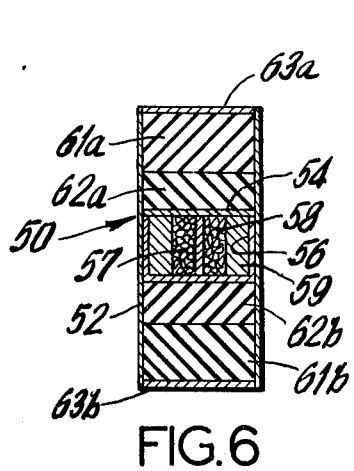
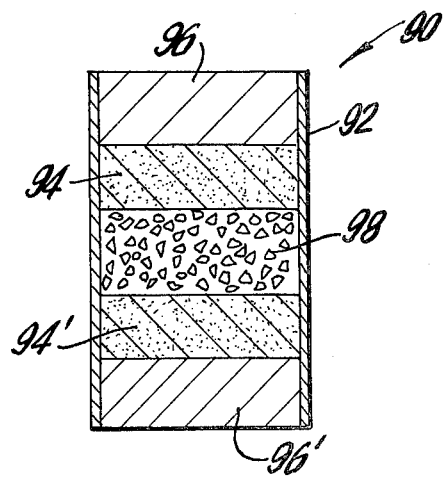

LUBRICANT PACKED WIRE DRAWING DIES

This invention relates to lubricant packed wire drawing dies composed of polycrystalline diamond, cubic boron nitride, and the like. In addition, it relates to composites comprising an inner core of such dies and an outer jacket of metal bonded carbide bonded directly to the core.

BACKGROUND OF THE INVENTION

Wires of metals such as tungsten, copper, iron, molybdenum, stainless steel, and the like, are produced by drawing the metals through dies of hard materials, such as diamond, tungsten carbide, and the like. Single crystal diamond dies are especially useful, but they can be difficult to fabricate, tend to chip easily, and often fail catastrophically because of the extreme pressures involved and because they are relatively easily cleavable. Tungsten carbide dies are less expensive, but have short die lives and are much less harder than diamond. A new family of dies which avoid these problems of single crystal diamonds and tungsten carbide comprise microporous masses compacted from tiny crystals of natural or synthesized diamonds or from crystals of cubic boron nitride. The compacts are formed by sintering, cementing and similar processed, and the technology involved in producing compacted diamond crystals of this type can be found, for example, in Strong, U.S. Pat. No. 3,407,445, Wentorf & Rocco, U.S. Pat. No. 3,831,428, Bovenkerk et al, U.S. Pat. No. 3,744,982 and U.S. Ser. No. 292,155, filed Sept. 25, 1972 by H. P. Bovenkerk and Glenn T. Malloy, entitled "Method of Making Diamond Compacts", and now abandoned, which describe high pressure reaction processes for the preparation of diamond compacts of predetermined shapes from shaped charges. Other useful disclosures by way of background may be found in Wentorf and Rocco, U.S. Pat. No. 3,745,623. Disclosure relating to the technology of formation of compacted bodies of finely divided cubic boron nitride crystals can be found in Wentorf, U.S. Pat. No. 3,233,988, Wentorf and Rocco, U.S. Pat. No. 3,743,489, and the said U.S. Pat. No. 3,744,982. Methods of forming polycrystalline compacts are also disclosed in Hall U.S. Pat. Nos. 3,829,544 and 3,816,085. The disclosures of these patents and the application are incorporated herein by reference. In especially preferred embodiments, there are provided composite wire drawing die constructions in which the die core comprises a compacted mass of diamond, cubic boron nitride, or a mixture thereof, and an outer jacket comprises a cemented carbide bonded directly to the core. The outer jacket provides compressive support to the die core. Moreover, it facilitates mounting the die in high strength metal rings, for example, because the expense of grinding the outer irregular surface of the die (as made) to a suitable shape is avoided.

The holes of wire drawing dies prepared from such compacts have a micro-rough structure, i.e., they contain tiny voids and/or irregularities between microcrystals.

The polycrystalline hard masses made via the teachings of Bovenkerk and Malloy, on the one hand, and Hall, on the other hand, which may be used for wire drawing dies generally contain both micro-voids/pores and softer inclusions distributed relatively uniformly throughout the polycrystalline mass. They are not flanked or jacketed by metal bonded carbide bonded directly to the polycrystalline mass as in composite wire drawing dies. In the latter, the polycrystalline mass of diamond and/or cubic boron nitride contains very few if any micro-voids/pores. The metal cemented carbide jacket provides a source of flowable metal, e.g., cobalt, at pressure and temperature conditions of preparation which sweeps or infiltrates through the polycrystalline mass and fills any voids/pores with metal.

In making any wire drawing die, however, a double-tapered hole is drilled (or otherwise formed in the compacting process), shaped and polished to a size required in the polycrystalline diamond and/or cubic boron nitride mass. A polycrystalline diamond or cubic boron nitride die hole surface is microscopically rough after polishing, and pockets in the wire drawing surface appear to be due to the following factors:

i. micro-voids/pores throughout the initial polycrystalline mass prior to drilling and, therefore, present on the hole surface after drilling;

ii. softer metal or non-metallic inclusions along crystal grain boundaries or as particles in the initial polycrystalline mass where diamond-diamond bonding is not present are more easily eroded or polished away leaving a microporous and/or "channeled" hole surface;

iii. diamond crystals have a high degree of hardness variation depending on crystallographic orientation and, therefore, a polycrystalline mass of randomly oriented diamond will have a rough surface due to variations in the ease of polish of individual crystals; and iv. micro-chipping of individual crystals occurring during polishing and resulting in a micro-rough hole surface.

In any event, because of these voids, surface irregularities and variations in the degree of hardness of individual microcrystals due to crystal orientation, the pierced or otherwise formed double tapered drawing aperture or throat does not polish to the same finish as can be obtained with mined single crystal diamonds. In fact, the throat of the die exhibits considerable porosity, e.g., ranging from 3 to 20% by volume. This porosity and surface irregularity due to variability in crystal hardness is responsible for production of wires with unsuitable surface finish and causes an undue amount of force to be expanded in the drawing operation, in comparison with single crystal dies, for example. It has now been discovered that if the pores in the compact which open into the throat of the die bore are densely packed with a solid lubricant, there is an unexpected improvement in performance of the die. The means for packing the pores with the selected lubricant are not critical, but one convenient way to do so is to draw a lubricant coated wire blank through the die. This causes transfer of the lubricant from the blank to the pores of the die bore surface by stripping it from the blank during passage through the die. Dense packing is insured because of the force exerted by the blank against the hole walls. If such a die then is used to draw wires in production, the force required to pull wires through it is substantially less than that required for microporous dies which have not been packed with lubricant in accordance with this discovery. Moreover, the surfaces of the wires drawn through such lubricant-packed compact dies is much smoother, and more comparable to those prepared by drawing through single crystal diamond dies.

One partial explanation for the large drawing force required with an unlubricated die is thought to be that the micro-voids tend to fill with metal shaved from the drawn wire, which voids when filled, in turn cause an increase in the drawing force due to metal to metal bonding or welding between the entrapped metal and the metal wire. The tendency of the voids to be filled with metal is thought to be reduced in accordance with this discovery.

In addition to reducing the drawing force and improving the surface appearance of the drawn wire, the lubricant-packed dies of this invention provide superior wear properties.

Also, the lubricant is thought to have a tendency to self-heal small chipped regions in the bore thereby reducing the tendency of the chipped region to be enlarged by additional chipping.

SUMMARY OF THE INVENTION

According to the invention, there are provided improved wire drawing dies comprising masses of compacted polycrystalline diamond, compacted cubic boron nitride, and mixtures thereof, having a micro-rough drawing surface which has been packed with solid wire drawing lubricants. In their broadest aspects, such die constructions will consist of a mass having a centrally located double tapered hole with a micro-rough wall, and the micro-rough hole wall will be densely packed with a lubricant for wire drawing. In a preferred embodiment, the lubricant-packed wire drawing die will be assembled into a combination in which the die comprises a core within an outer, jacketing mass of a metal bonded composite, there being a direct bond induced by high pressure and temperature therebetween. Preferably the mass will be polycrystalline diamond, especially boron doped, or boron alloyed diamond, or polycrystalline cubic boron nitride, especially beryllium-alloyed cubic boron nitride.

BRIEF DESCRIPTION OF THE DRAWINGS

The invention may be more readily understood by reference to the drawings in which:

FIG. 1 is a sectional view through a compacted polycrystalline diamond wire drawing die in which the micro-rough wall of the tapered hole is packed with lubricant according to this invention;

FIG. 2 is a sectional view through a compacted composite wire drawing die in which a polycrystalline core is in a generally cylindrical configuration and has a double-tapered hole extending therethrough; this embodiment shows a metal bonded carbide jacket directly bonded to the core;

FIG. 2A is an enlarged view of a portion of FIG. 2 showing the micro-rough surface exposed at the hole wall to be densely packed with a wire drawing lubricant in accordance with this invention;

FIG. 3 is a section through a die in the shape of a solid of revolution composed of a polycrystalline core. In this embodiment, the core is flanked top and bottom by layers of metal bonded carbide (and girded by an integral collar of metal bonded carbide) directly bonded thereto; the polycrystalline mass defines the throat region at least of the double-tapered hole employed to conduct the wire shaping and sizing;

FIG. 3A is an enlarged view of a portion of FIG. 3 showing the micro-rough surface exposed at the hole wall to be densely packed with wire drawing lubricant according to this invention;

FIG. 4 is a sectional view partially in elevation illustrating an exemplary high pressure, high temperature apparatus for the preparation of the structures used for packing with lubricant in accordance with this invention;

FIG. 5 is a sectional view illustrating a charge assembly for introduction into the working volume of the apparatus of FIG. 4 to produce a compacted blank which is pierced to produce a die suitable for packing (FIG. 1); and FIG. 6 is a sectional view illustrating a charge assembly for production of a jacketed, i.e., composite die (FIG. 2).

DETAILED DESCRIPTION OF THE INVENTION

The compacted mass comprising the body of the die consists of diamond crystals or cubic boron nitride crystals bonded to each other, yet leaving a multitude of micropores or voids or inclusions of material softer than diamond and/or cubic boron nitride crystals, depending upon whose teachings are followed (see above).

In its broadest aspects, the invention contemplates an unjacketed die including a double tapered hole. The micro-rough surface in the die exposed at the hole wall will be densely packed with a lubricant for wire drawing. The nature of the lubricant is not critical. Generally, however, a solid lubricant will be used. Preferably, it will comprise graphite, molybdenum disulfide, hexagonal boron nitride, fats, waxes, soaps, polytetrafluoroethylene, or a mixture thereof. Synthetic and mineral oil-based lubricants can also be used.

Broadly, the die blanks will be prepared by compacting the diamond or cubic boron nitride fine crystals at a pressure in excess of 40 kilobars and a temperature in excess of 1200° C. in a high temperature high pressure apparatus of the type described in Hall, U.S. Pat. No. 2,941,248, until there is formed a high-strength, coherent polycrystalline compact.

For illustrative purposes, a boron-alloyed diamond compact is prepared following the teachings of the above-mentioned Bovenkerk and Malloy patent, U.S. Pat. No. 3,744,982. Moreover, a beryllium-alloyed cubic boron nitride (CBN) compact is also prepared following those teachings.

The starting materials are boron-alloyed finely divided diamonds or beryllium-alloyed finely divided CBN. While they may be made in accordance with the method of Wentorf et al U.S. Pat. No. 3,148,161 or Wentorf U.S. Pat. No. 3,078,232, it is understood that they are not limited to these methods. Any means for achieving the alloying will be satisfactory. It is also desirable that the starting diamond material be subjected to a rigorous cleaning step such as acid treatment, ion bombardment by electrical discharge cleaning, ultrasonic cleaning, high temperature vacuum degassing, and combinations thereof, in order to produce a final compact possessing maximum cohesion.

The alloyed material is mixed with titanium or zirconium diboride powder until the mixture contains one-half to twenty weight percent of diboride. Excellent results are achieved if diboride is present to the extent of about one percent by weight and this is a preferred proportion. The mixture is subjected to a sintering step carried out at pressures in excess of 40 to 50 kilobars — preferably about 65 to 100 kilobars — and temperatures in excess of 1200° C. or higher — for periods of time ranging from about 10 to 30 minutes. A suitable apparatus for carrying out the sintering operation is disclosed in Hall U.S. Pat. No. 2,941,248 which is included by reference herein. Preferably, the sintering operation is performed in an inert container or one in which a reducing atmosphere is present during the sintering.

Pressures which should be used in preparing the compacts of the invention are based upon a calibration procedure which is related to known electrical resistance changes of various metals at room temperature under known pressures as described and illustrated in the aforementioned U.S. Pat. No. 2,941,248 and as modified by correcting the calibration as described in "Calibration Techniques in Ultra-High Pressure Apparatus", F. P. Bundy, Journal of Enigneering for Industry, May 1961, transactions of the ASME, Series B.

With special reference to CBN, the temperature and pressure conditions for sintering are such that the hexagonal form of the starting material would, if present, be transformed into the cubic form. These conditions are well known and understood. Another way of describing the conditions is to say that the mixture will be subjected to a temperature of at least 1300° C. in the cubic-stable region of the cubic-hexagonal pressure-temperature phase diagram. For a sintering temperature of 1300° C. this requires a pressure in excess of 50 kilobars. For a sintering temperature of 1500° to 1800° C. the pressure must be at least 65 to 70 kilobars.

For purposes of further illustration, boron-doped diamond compact die blanks will be prepared by bonding boron-doped diamond crystals in contact with one-quarter to one and one-half percent by weight of a boron-containing compound, e.g., titanium diboride, under the high temperature and high pressure conditions described above, see, e.g., the above-mentioned application Ser. No. 292,155.

The compacted polycrystalline die shown in FIG. 1 comprises a generally cylindrical mass 9 having a properly sized and shaped hole 12 therethrough. Mass 9 is compacted polycrystalline diamond or cubic boron nitride or a mixture thereof. Walls 6 of mass 9 are micro-rough, and lubricant 2 is seen to be densely packed in the voids of hole wall 6.

In those constructions in which diamond crystals are employed for the die, very extensive diamond bonding is achieved following the procedure of the said U.S. Pat. Nos. 3,745,623 and 3,744,982 and the said U.S. Ser. No. 292,155. When cubic boron nitride crystals or mixtures thereof with diamond crystals are employed, a metallic phase must be included for bonding. In the said U.S. Pat. No. 3,743,489, the metallic phase is disclosed to contain aluminum and an alloying element selected from nickel, cobalt, manganese, iron, vanadium and chromium. The amount of aluminum present relative to the amount of alloying metal is not critical and may range from equal parts by weight to about 1 part of aluminum to 10 parts of alloying metal. The amount of aluminum in the starting material may range from about 1 to about 40 percent by weight of the cubic boron nitride, while the range of the alloying metal may range from about 2 to about 100 percent of the cubic boron nitride.

The amount of these alloying metals remaining in the consolidated cubic boron nitride as matrix material will vary depending upon the pressure and length of application of high pressure/high temperature conditions. In any event the quantity of aluminum plus alloying metal atoms in the compacted cubic boron nitride will be in excess of about 1 percent by weight of the cubic boron nitride.

The preferred size range for the diamond grains is about 50 micrometers and for the cubic boron nitride is 0.1–10 micrometers. Other sizes may, of course, be employed. The diamond grains may range in size from about 0.1 micrometers to about 500 micrometers in largest dimension and the cubic boron nitride grains may range from about 0.1 to 300 micrometers in largest dimensions.

In composite dies, a high pressure reaction cell is charged with 100 percent volume diamond resulting in a composition for the die core, when formed, of 80–98 percent by volume diamond and 2–20 perecent by volume of the metal bonding medium infiltrated from the metal bonded carbide jacket ring and/or substrate. Alternatively, the diamond consisting of 70–95 percent by volume, is mixed with metals, metal compounds or metal alloy powders to form the core.

The die core of a composite when cubic boron nitride grains are employed is 80–97 percent by volume cubic boron nitride with the balance being the metallic medium either from the ring/substrate or the ring/substrate plus the material added to the starting cubic boron nitride.

In those embodiments in which the die is bonded and girded with a jacket, the ideal support material has been determined to be metal bonded carbide (sometimes referred to as "sintered carbide" and "cemented carbide") and it has been found that the best way to interpose this material between the die core and the binding ring(s) is to bond the metal bonded carbide directly to the die core. In the preferred construction the metal bonded carbide is in the form of a jacket properly shaped at its outer surface to match the inner surface of the binding ring in which the composite is to be mounted. In so directly bonding the die core and the metal bonded carbide it was found that the composite structure created between these materials by the application of high pressures and high temperatures acts to compress the core, giving it radial stress support. This latter aspect is important both during manufacture of the composite die and during use of the die in the stressed condition. The choice of cemented carbide also gives a composite having materials of closely matched thermal characteristics.

In greater detail, a preferred die is the composite 10 shown in FIGS. 2 and 2A. The die core 11 in a generally cylindrical shape has a properly sized and shaped hole 12 therethrough. Core 11 is shown as a polycrystalline mass of diamond crystals, cubic boron nitride crystals or a mixture thereof. Jacket 13 is a mass of metal bonded carbide directly bonded to die core 11 along an interface free of voids and irregular and interlocked on the scale of about 1–100 micrometers, the interlocking occurring between individual abrasive crystals and portions of the metal bonded carbide mass. FIG. 2A shows in more detail core 11 in which lubricant 2 is seen to be densely packed in micropores 4 at wall 6 of hole 12.

An alternate construction is shown in FIG. 3 in which the composite 20 consists of an inner polycrystalline abrasive core 21 initially flanked on top, bottom and side by masses 22a and 22b and girded by an annulus 22c of metal bonded carbide. In the completed composite shown, masses 22a, 22b and 22c are integral. In both constructions, the composites have been shaped as solids of revolution (preferably with a 2°–4° taper).

In this way, the throat of hole 23 is made of the strong highly wear-resistant material. FIG. 3A shows in more detail core 21 in which lubricant 2 is seen to be densely packed into the micro-rough surface 4 at wall 6 of hole 23.

The compacted polycrystalline structures for use in this invention are prepared in the working volume of a high temperature/high pressure apparatus of the type illustrated in FIG. 4. After a compacted mass has been formed and the hole extending therethrough has been polished, it is packed with the lubricant.

One charge assembly useful in the practice of this invention is shown in FIG. 5 and another is shown in FIG. 6.

Referring to FIG. 4, apparatus 30 includes a pair of cemented tungsten carbide punches 31 and 31' and an intermediate belt or die member 32 of the same material. Die member 32 includes an aperture 33 in which there is positioned a reaction vessel 34 shaped to contain a charge assembly to be described hereinbelow. Between punch 31 and die member 32 and between punch 31' and die member 32 there are included gasket/insulating assemblies 35 each comprising a pair of thermally insulating and electrically non-conducting pyrophyllite members 36 and 37 and an intermediate metallic gasket 38.

Reaction vessel 34 in the one preferred form includes a hollow alumina cylinder 39. Cylinder 39 may be of another material, such as talc, pyrophyllite, salt or magnesia.

Positioned concentrically within the adjacent cylinder 39 is a graphite electrical resistance heater tube 40. Within graphite heater tube 40 there is in turn concentrically positioned the cylindrical salt liner 41. The ends of liner 41 are fitted with salt plugs 42, 42', disposed at the top and bottom, respectively.

Electrically conductive metal and discs 43 and 43' are utilized at each end of cylinder 39 to provide electrical connection to graphite heater tube 40. Adjacent each disc 43, 43' is an end cap assembly 44 and 44' each of which comprises a pyrophyllite plug or disc 45 surrounded by an electrically conducting ring 46.

Operational techniques for simultaneously applying both high pressures and high temperatures in this apparatus are well known to those skilled in the superpressure art. The foregoing description relates to merely one high pressure, high temperature apparatus. Various other apparatuses are capable of providing the required pressures and temperature that may be employed within the scope of this invention. Charge assemblies for making unjacketed composite die core structures are described in U.S. Pat. Nos. 3,407,445, 3,745,623 and U.S. Ser. No. 292,155 (diamond), U.S. Pat. No. 3,743,489 (boron nitride) and U.S. Pat. No. 3,744,982 (both diamond and boron nitride).

With respect to unjacketed die 9 and referring to FIG. 5, charge assembly 90, although not illustrated to the same scale, fits within space 51 of the apparatus of FIG. 4. Charge assembly 90 consists of graphite tube 92, and graphite end plugs 94 and 94' and alumina end plugs 96 and 96'. The latter fit within the upper and lower portions of graphite inner liner 92 and alumina (or other) cylinder 41 respectively to support, shield and insulate the components of the reaction vessel. In a typical compacting operation, diamond crystals 98 are manually packed into the graphite lined, indirectly heated assembly 90 and sintered as described above.

With respect to the composite, i.e., jacketed cores, and referring to FIG. 6, charge assembly 50 although not illustrated to the same scale, fits within space 51 of the apparatus of FIG. 4. Charge assembly 50 consists of cylindrical sleeve 52 of shield metal selected from the group consisting of zirconium, titanium, tantalum, tungsten, and molybdenum. Within cylindrical shield metal sleeve 52 is a sub-assembly confined within shield metal disc 54 and shield metal cup 56. For the arrangement shown, which will produce a composite having a straight hole predisposed through a polycrystalline core, a wire 57 appropriate dimension (e.g., a 0.010 inch diameter tungsten wire) is properly located and supported by attachment thereof, as by welding, to the bottom of cup 56. A mass 58 of strong abrasive grains (diamond, cubic boron nitride or a mixture thereof) is disposed around wire 57 to fill the cavity in sleeve 59 made of cold-pressed sinterable carbide powder (mixture of carbide powder and appropriate metal bonding medium therefor). If desired, sleeve 59 may be made of presintered metal bonded carbide as will be described hereinbelow. If desired, wire 57 can be omitted. The presence is preferred when making dies with a medium-sized hole for drawing wires of sizes 0.015 inch diameter or larger.

Tungsten is a particularly good metal to use for the formation of the hole to pass through the polycrystalline core, because tungsten has a high melting point and is a stiff enough metal to resist distortion by the abrasive grains during the compression and sintering step at the high temperatures and pressures employed. Tungsten is also not too difficult to dissolve or grind away later. Other materials may also be employed, e.g., molybdenum, zirconium, titanium, tantalum, rubidum, rhodium, rhenium, osmium cobalt, nickel, iron, graphite or refractory carbides, and even non-metals such as refractory oxides. The wire need not have a uniform cross section as shown, but may be of a configuration such as will minimize the effort required to shape the preformed hole to the desired double taper.

The balance of the volume in charge assembly 59 is taken up with discs 61a, 61b made of the same material as cylinder 39, e.g., alumina, sodium chloride, and the like, and discs 62a, 62b made of hexagonal boron nitride. Discs 62a, 62b are provided to minimize the entry of undesirable substances into the subassembly defined by disc 54 and cup 56. It has been found that when either zirconium or titanium is employed for sleeve 52, disc 54 and cup 56, the presence of these materials enhances the sintering of the abrasive grains and bonding of the abrasive grain mass to the metal bonded carbide jacket.

In the preparation of a composite die having a diamond core the charge assembly 50 is placed in the apparatus 30, pressure is applied thereto and the system is then heated. The temperatures employed are in the range from about 1,300°–1,600° C. for periods of time in excess of about 3 minutes in order to sinter the carbide/metal bonding agent mixture while at the same time, the system is subjected to very high pressure, e.g., of the order of 50–70 kilobars, to insure thermodynamically stable conditions for the diamond content of the system. At 1,300° C., the minimum pressure should be about 50 kilobars and at 1.400° C., the minimum pressure should be about 52.5 kilobars. At the temperature employed, of course, the metal bonding component of the system is melted making some of the metal bonding component available for displacement from mass 59 into mass 58, where it must be able to function as a catalyst-solvent for diamond growth, particularly in the preparation of a polycrystalline diamond core.

In the preparation of a composite die having a cubic boron nitride or cubic boron nitride/diamond core, the charge assembly 50 is placed in the apparatus 30, pressure is applied thereto and the system is then heated. The temperatures employed are in the range from about 1,300°–1,600° C. for periods of time in excess of about three minutes while at the same time the system is subjected to very high pressure, e.g., of the order of 40 to 70 kilobars to insure thermodynamically stable conditions for the cubic boron nitride content of the system. At 1,300° C., the minimum pressure should be about 40 kilobars and at 1,600° C., the minimum pressure should be about 50 kilobars. At the temperatures employed, the sintering agent in mass 59 is melted, making cobalt, nickel or iron (depending on the particular sinterable carbide formula) available for displacement from mass 59 into mass 58, where it alloys with the molten aluminum alloy, which is present or formed in mass 58. The metallic medium so formed functions as an effective bonding agent for the cubic boron nitride crystals near the interface between mass 58 and 59 for bonding these crystals to each other and to the sintered carbide. The rest of the crystals in the mass of cubic boron nitride are bonded together by the metallic medium present (introduced or formed in situ) and by reaction of this alloy with cubic boron nitride.

The direct bonding relationship created between the very high strength wear resistant core and the surrounding or flanking stiff carbide support material obviates any need for the interposition of any bonding layer therebetween. By providing stiff, non-yielding support material in direct contact with the inner die core (e.g., mass 11 or mass 21), a composite results which is unusually strong and durable, because of the complementary nature of the properties of these materials used in combination in this application. The quality of the bond at the interface is such that the interface is in general stronger than the tensile strength of the abrasive grains.

The carbide powder, where employed, is preferably a tungsten carbide molding powder (mixture of tungsten carbide powder and cobalt powder) commercially available in particle sizes of from 1 to 5 microns. The tungsten carbide may, if desired, be replaced in whole or in part by either or both of titanium carbide and tantalum carbide. Also, small quantities of other carbide powders may be utilized in order to secure unusual properties in the composite. Since some use of nickel and iron has been made in the bonding of carbides, the material for providing the metal bond in the cemented carbide may be selected from the group consisting of cobalt, nickel, iron and mixtures thereof. Cobalt, however, is preferred as the metal bond material. The composition of carbide molding powders useful in the practice of this invention may consist of mixtures containing about 75–94 percent by weight carbide and about 6–25 percent by weight metal bond material. Examples of carbide powders used are Carboloy grade 883 carbide (6% by weight, Co, 94% by weight WC), Carboloy grade 55A (13% by weight Co, 87% by weight WC) and Carboloy grade 190 (25% by weight Co, 75% by weight WC). A presintered cemented carbide sleeve (FIG. 2) or discs (FIG. 3) can be prepared, if desired, using the above described powders. The sintered component is then used in place of the cold-pressed shapes referred to hereinabove.

Composite dies may, of course, be prepared with no hole therethrough, with a straight hole therethrough or with a double tapered hole therethrough, but in any event, some shaping of the hole will be required to provide the exact dimensions. Shaping is facilitated by having a hole "built into" the composite die core so that a wire impregnated with diamond dust can be drawn therethrough. If desired, an initial hole can be made through the die core using a laser. When the holes in die cores become enlarged from normal wear and erosion, the holes can be re-shaped for drawing larger wire.

DESCRIPTION OF THE PREFERRED EMBODIMENTS

The following examples illustrate the preparation of lubricant-packed wire drawing dies according to this invention. They are illustrative and are not to be construed to limit the scope in any manner whatsoever.

EXAMPLE 1

A charge assembly as illustrated in FIG. 5 is prepared. Boron-alloyed diamond fines, the particles of which are smaller than 100 microns in diameter and predominately smaller than 40 microns in diameter (Wentorf et al U.S. Pat. Nos. 3,148,161 and 3,078,232) are mixed with titanium diboride powder to provide an overall weight percentage of about 1% of $TiB_2$. The alloyed material is packed into the assembly between plugs 94 and 94'. The charge assembly is exposed to a pressure of about 58 kilobars, while it is heated to 1550° C. for 60 minutes. After cooling, the pressure is removed and the mass is recovered as a cylinder. A centrally located double tapered hole is produced and polished to a final 0.0403 inch diameter. The hole surface is examined and found to exhibit considerable micro-roughness. A copper wire of 0.0452 inch diameter and coated with a lubricant layer comprising a solid mixture of soaps and fats is used to pack the micro-rough surface in the die throat. The copper is drawn through the die and the lubricant efficiently transfers from the wire into the micropores and densely packs the same. The resulting packed die is then ready for drawing wire.

EXAMPLE 2

The procedure of Example 1 is repeated, substituting for the boron-alloyed diamond fines, a corresponding amount of beryllium-alloyed cubic boron nitride fines. A packed compacted polycrystalline cubic boron nitride die according to this invention is obtained.

EXAMPLE 3

A charge assembly as illustrated in FIG. 5 is prepared. Boron-doped diamond crystal fines (less than 100 microns in size) are prepared by diffusion of boron into the crystals at pressures about 8500 atmospheres and temperatures above 1300° C. by the process shown in Wentorf, U.S. Pat. No. 3,141,855, incorporated herein by reference. The crystals, which contain 0.2 to 0.5% by weight boron, are placed in the assembly with up to 1.5% of titanium diboride, and compacted in the procedure of Example 1 to a highly dense wire drawing die blank. This is pierced and the hole wall polished to micro-roughness. The micro-voids in the hole wall are packed with solid lubricant and a die according to this invention is obtained.

EXAMPLE 4

A charge assembly as illustrated in FIG. 6 is prepared. A hole 0.170 inch in diameter is made in cylinder 59 of sintered tungsten carbide-cobalt (87% wt. %WC, 13 wt. % Co) which has an outside diameter of 0.347 inch and a length of about 0.250 inch. The hole is filled with mass 58 of about 50 micrometers synthetic diamond grit and the assembly is enclosed in 0.002 inch thick zirconium can and is placed in a high pressure, high temperature reaction cell as described hereinabove. The charge assembly is exposed to a pressure of about 55 kilobars, while it is heated to about 1550° C. for 60 minutes. After cooling, the pressure is removed and the mass is recovered as a strong cylinder. The zirconium outer layer is removed with abrasive and each face of the cylinder is polished on a diamond lap until the ends of the diamond core are flat and can be observed under the microscope. The diamond core is found to consist of many grains firmly bonded together with much diamond-to-diamond bonding evident. The length of the cylinder is 0.205 inches. The sides of the cylinder are then ground with a 2 percent taper so that the large end has a diameter of 0.329 inches and the small end has a diameter of 0.325 inches.

A ring is made of 18-8 stainless steel having a thickness of 0.375 inch, an outer diameter of 1.00 inch and an inner hole with a 2 percent taper and having a diameter of 0.3266 inch at the large end. The diamond-carbide composite cylinder is pushed into this hole with a force of about 500 pounds. In this way, the steel outer ring exerts a hoop confining stress of about 40,000 psi on the composite cylinder inside it.

The diamond core in this assembly is pierced and finished by conventional means to produce a die for drawing 0.0403 inch diameter copper wire.

The throat of the diamond die is examined under high magnification and found to exhibit considerable micro-roughness. A copper wire of 0.0452 inch diameter coated with a lubricant layer comprising a mixture of soaps and fats is used to pack the micropores in the throat of the die. The copper is drawn through the die and the lubricant of soaps and fats efficiently transfers from the wire into the micropores and densely packs the same. The resulting packed die is then ready for drawing copper wire.

EXAMPLE 5

The procedure of Example 1 is repeated, except that the die is pierced and polished to provide a 0.016 inch (16.0 mil) throat. Graphite coated tungsten wire 0.018 inches in diameter is pulled through the die at the rate of 52 feet per minute. The die is fairly rough for several feet of pull and the pull force is fairly high. The heat on the wire is 900° C. before the die and the die temperature is 210° C. After a few feet of wire is drawn, the force decreases markedly. The packed die is then used to draw tungsten wire.

EXAMPLE 6

The procedure of Example 4 is repeated, substituting for the diamond fines a mixture comprising 94 volume percent of cubic boron nitride powder having particle sizes between 0.1 and 10 micrometers and 6 volume percent of 300/400 mesh $NiAl_3$ powder. This is pierced and the hole wall polished to micro-roughness. The micro-voids in the hole wall are packed with solid lubricant and a die according to this invention is obtained Scanning electron microscope photographs (300 X) of wire drawn through dies packed with lubricant as described and compared with those of wires drawn through metal single crystal diamond dies, show that uniformity of diameter (roundness) and surface integrity of the wire from both dies are essentially equivalent.

Other modifications in the invention can be made in view of the above-detailed description. For example, instead of soaps and fats or graphite, the pores of the polycrystalline compact dies can be packed with other solid lubricants such as molybdenum disulfide, hexagonal boron nitride or a mixture thereof. Animal fats, petroleum greases, high molecular weight polymers, e.g., polytetrafluoroethylene or polyethylene, and waxes can also be used. In addition to tungsten and copper wires, the dies can be used to draw molybdenum, iron, stainless steel, and the like. All such obvious modifications and variations are intended to be within the full scope of the invention as defined in the appended claims.

We claim:

1. A wire drawing die comprising a mass having a centrally-located double tapered hole extending therethrough with micro-rough walls having pores, said mass comprising predominately a material selected from the group consisting of compacted polycrystalline diamond, compacted polycrystalline cubic boron nitride and mixtures thereof, wherein said mass has been compacted at a pressure of at least about 40 kilobars, and wherein substantially only the pores which are exposed at the surface of said micro-rough walls in said hole are densely packed with a lubricant for wire drawing.

2. A wire drawing die as defined in claim 1 wherein the micro-rough walls have been formed during polishing.

3. A wire drawing die as defined in claim 1 wherein said lubricant is a material selected from the group consisting of graphite, molybdenum disulfide, hexagonal boron nitride, fats, waxes, soaps, polytetrafluorethylene, and mixtures thereof.

4. A wire drawing die as defined in claim 3 wherein said lubricant is graphite.

5. A wire drawing die as defined in claim 1 wherein said mass is predominately compacted polycrystalline diamond.

6. A wire drawing die as defined in claim 5 wherein said mass is predominately compacted polycrystalline boron-doped diamond.

7. A wire drawing die as defined in claim 5 wherein said mass is predominately compacted polycrystalline boron-alloyed diamond.

8. A wire drawing die as defined in claim 1 wherein said mass is predominately compacted polycrystalline cubic boron nitride.

9. A wire drawing die as defined in claim 8 wherein said mass is predominately compacted polycrystalline beryllium-alloyed cubic boron nitride.

10. A wire drawing die as defined in claim 1 wherein said walls have micro-voids therein, said micro-voids located along crystal grain boundaries of said polycrystalline material.

11. A composite wire drawing die comprising in combination:

i. an inner mass having a centrally-located double tapered hole extending therethrough with micro-rough walls having pores, said inner mass comprising predominately a material selected from the group consisting of compacted polycrystalline diamond, compacted polycrystalline cubic boron nitride and mixtures thereof, wherein said mass has been compacted at a pressure of at least 40 kilobars, and wherein substantially only the pores which are exposed at the surface of said micro-rough walls in said hole are densely packed with a lubricant for wire drawing;

ii. at least one mass of metal bonded carbide directly bonded to and girding said inner mass for symmetrical support thereof, said mass of metal bonded carbide being predominately of carbide material selected from the group consisting of tungsten carbide, titanium carbide, tantalum carbide and mixtures thereof with the metal bonding material therein being present in a quantity of from about 3 percent to about 25 percent by weight and being selected from the group consisting of cobalt, nickel, iron and mixtures thereof; and iii. an interface between (i) and (ii) which is free of voids, irregular and interlocking on the scale of 1–100 micrometers.

12. A composite wire drawing die as defined in claim 11 wherein said lubricant is a material selected from the group consisting of graphite, molybdenum, disulfide, hexagonal boron nitride, fats, waxes, soaps, polytetrafluoroethylene and mixtures thereof.

13. A composite wire drawing die as defined in claim 12 wherein said lubricant is graphite.

14. A composite wire drawing die as defined in claim 11 wherein said inner mass is predominately compacted polycrystalline diamond.

15. A composite wire drawing die as defined in claim 11 wherein said inner mass is predominately compacted polycrystalline cubic boron nitride.

16. A composite wire drawing die as defined in claim 11 wherein the inner mass is in a generally cylindrical form and the carbide mass is in the form of a jacket there around.

17. A composite wire drawing die as defined in claim 16 wherein the composite is in the shape of a truncated core.

18. A composite wire drawing die as recited in claim 11 wherein the inner micro-rough mass is both flanked and girded by the mass of metal bonded carbide.

* * * * *